United States Patent [19]

Little

[11] Patent Number: 5,461,621
[45] Date of Patent: Oct. 24, 1995

[54] PAIR DIVISION MULTIPLEXER FOR DIGITAL COMMUNICATIONS

[75] Inventor: Vernon R. Little, Bekarra, Canada

[73] Assignee: PMC-Sierra, Inc., Burnaby, Canada

[21] Appl. No.: 251,958

[22] Filed: Jun. 1, 1994

[30] Foreign Application Priority Data

Apr. 6, 1994 [CA] Canada ................... 2120697

[51] Int. Cl.$^6$ .................. H04J 3/22; H04J 3/07
[52] U.S. Cl. ............ 370/84; 370/103; 375/355
[58] Field of Search ................ 370/100.1, 84, 370/95.1, 103, 105; 375/38, 110, 112, 118, 56, 354, 355

[56] References Cited

U.S. PATENT DOCUMENTS

| | | | |
|---|---|---|---|
| 4,481,640 | 11/1984 | Chow et al. | 375/56 |
| 4,630,286 | 12/1986 | Betts | 375/38 |
| 5,119,402 | 6/1992 | Ginzburg et al. | 375/38 |
| 5,253,254 | 10/1993 | Roberts et al. | 375/38 |

Primary Examiner—Benedict V. Safourek
Assistant Examiner—Ricky Q. Ngo
Attorney, Agent, or Firm—Pascal & Associates

[57] ABSTRACT

For use in a transmission system in which an input data stream is transmitted in plural data streams each at a fraction of the input data stream rate and plural clock stream pairs each at the fraction of the input data clock rate, a receiver, comprised of apparatus for receiving the plural data streams, apparatus for determining frame timing differences between frame signals contained in each of the received plural data streams, apparatus for varying the timing of one received data stream relates to another, whereby their relative timing is adjusted, apparatus for combining the timing adjusted plural data streams into an output data stream having a similar data stream rate as the input data stream, apparatus for recovering a clock from one of the plural data streams, and for generating an output clock signal therefrom at the input data clock rate, and apparatus for aligning the output data stream with the output clock signal, whereby an output data stream and an output clock signal are provided having similar data rates as the input data stream and clock rates.

14 Claims, 5 Drawing Sheets

PAIR DIVISION MULTIPLEXER FOR DIGITAL COMMUNICATIONS

FIELD OF THE INVENTION

This invention relates to the field of data transmission, and in particular to such a system for recombining at a receiver plural slow data rate odd and even data signals derived from an input signal, into an output signal at the input signal data rate, without regard to the sense of the odd and even data signals applied to the receiver.

BACKGROUND TO THE INVENTION

In digital communications systems, the physical and electrical characteristics of the transmission facility normally limits the maximum rate at which data can be transmitted, the maximum transmission distance, the noise susceptibility and the emissions that cause radio frequency interference (RFI). To overcome this limitation, common practice is to reduce the data symbol rate (the baud rate), to a lower frequency by generating codes with multiple levels, multiple phases, or both.

This multilevel, multiphase coding can be very expensive to design and manufacture and can consume a great deal of power, particularly at high speeds. This can prevent its use in cost sensitive applications, such as in computer local area networks.

An alternative technique that reduces the cost and power consumption is to use multiple pairs of wires to reduce the data rate on each pair, thus allowing for an increase in transmission distance for the same performance, and a reduction in RFI. In many installations, users have extra pairs of wires installed, and are willing to use them to reduce the cost of the communications equipment.

Recent proposals for 100 megabit Ethernet networks include using multiple wiring pairs to reduce the bit rate on each pair, to allow transmissions over common in-office twisted pair wiring without violating the U.S. Federal Communication Commission's RFI emissions guidelines and to provide reliable data transport.

Such systems are restricted to particular data protocols specifically designed to accommodate the data rate, and thus cannot carry any or all data streams which use any protocol.

SUMMARY OF THE INVENTION

The present invention provides for distribution of signals over plural (such as two) pairs of wires, but can transparently carry conventional data transmission protocols, instead of being restricted to a special protocol to accommodate the data rate. Any transmission protocol which uses regularly repeating adjacent multi-bit framing patterns can be used. One example of such a protocol is the SONET (Synchronous Optical Network) protocol.

By using existing communications protocols, hardware costs are minimized, no software is required, and complete data transparency is assured.

An embodiment of the present invention also allows the installer to connect either of the wiring pairs to either input of the receiver, without regard to which pair is connected to which input. Pair select circuitry automatically determines which of the data streams contains the even and which the odd framing bits, and places them in correct order in the resulting output signal from the receiver. This simplifies the wiring installation by making the proper connections of the wiring pairs to the equipment less important, and it simplifies the design of the transmitter, which can arbitrarily choose even and odd assignment without knowledge of frame boundaries.

In accordance with an embodiment of the invention, a transmission system is comprised of apparatus for receiving an input data stream with repeating, adjacent multi-bit framing patterns and a synchronous clock at a first data rate and a first clock rate, apparatus for dividing the input data stream into a pair of data streams and clock streams each at half the bit rate of the input data stream and input clock rate, each of the pair of data streams being comprised of even or odd bits from the input data stream and a half-rate clock signal, apparatus for carrying the pairs of data and clock streams on separate transmission facilities, a receiver for receiving the pairs of data and clock streams via undifferentiated inputs, apparatus in the receiver for automatically determining the odd and even nature of the bit data streams and apparatus for interleaving the odd and even bit streams in proper order and with timing relative to the framing patterns to provide an output signal at the same data rate as the input data stream.

In accordance with another embodiment, for use in a transmission system in which an input data stream is transmitted in plural data streams each at a fraction of the input data stream rate and plural clock stream pairs each at said fraction of the input data clock rate, a receiver is comprised of apparatus for receiving the plural data streams, apparatus for determining frame timing differences between frame signals contained in each of the received plural data streams, apparatus for varying the timing of one received data stream relative to another, whereby their relative timing is adjusted, apparatus for combining the timing adjusted plural data streams into an output data stream having similar data stream rate as the input data stream, apparatus for recovering a clock from one of the plural data streams, and for generating an output clock signal therefrom at the input data clock rate, and apparatus for aligning the output data stream with the output clock signal, whereby an output data stream and an output clock signal are provided having similar data rates as the input data stream and clock rates.

In accordance with another embodiment of the invention, for use in a transmission system in which an input data stream is transmitted in a pair of data streams each at a fraction of the input data stream rate and a pair of clock stream pairs each at said fraction of the input data clock rate, a receiver is comprised of apparatus for receiving the pair of data streams, apparatus for determining frame timing differences between frame signals contained in each of the received pair of data streams, apparatus for varying the timing of one received data stream relative to another, whereby their relative timing is adjusted, apparatus for detecting which of a stream of data frames contains odd framing patterns and which of a stream of data patterns contains even framing patterns, apparatus for reversing the even or odd sense of the framing patterns in the event the skew of the framing patterns relative to the data of one data stream is greater than a predetermined number of bits, apparatus for varying the timing of one data stream relative to the other with odd and even frames of data in correct order as determined by the odd and even frame detecting and sense reversing means, and apparatus for combining the timing adjusted plural data streams into an output data stream having similar data stream rate as the input data stream, whereby an output data stream having a similar data sequence as the input data stream is provided.

BRIEF INTRODUCTION TO THE DRAWINGS

A better understanding of the invention will be obtained by reading the description of the invention below, with reference to the following drawings, in which:

FIG. 1 is a block diagram of a system in which the invention may be implemented, FIG. 2 is a logic diagram of a framer transmitter used in the system of FIG. 1, and FIGS. 3A and 3B, placed together, is a logic diagram of a preferred form of pair division multiplex receiver and near end framer receiver,

DETAILED DESCRIPTION OF THE INVENTION

Figure 1:
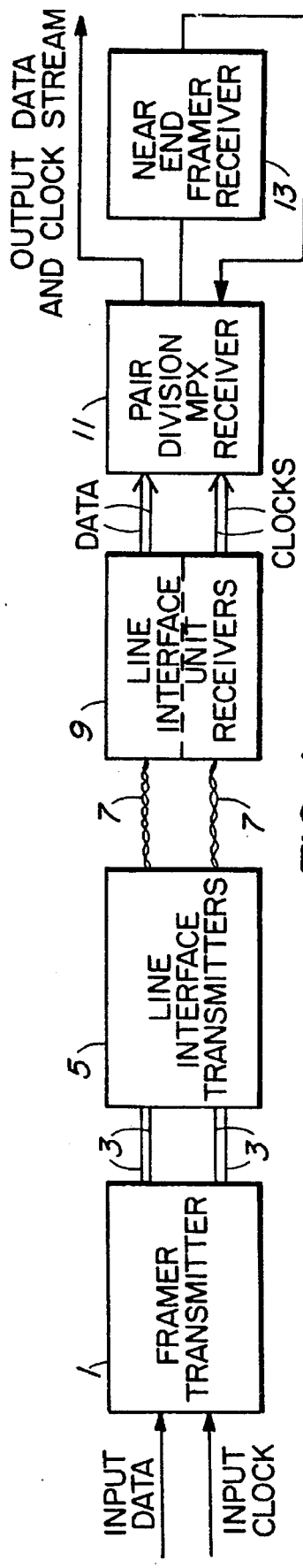

A transmission in which the invention may be implemented is illustrated in FIG. 1. An input digital data bit stream is received by a pair division multiplex transmitter 1, the data bit stream contains repeating, adjacent multi-bit framing patterns and a synchronous clock. Transmitter 1 splits the input data and clock stream into two data and clock stream pairs, each operating at on-half the bit rate of the input data bit stream, and applies them via paths 3 to a line interface transmitter 5. It is unimportant which stream contains the even bits, and which contains the odd bits, since in accordance with this invention, a downstream receiver automatically detects the correct relationship thereof. The line interface transmitter performs line encoding, pulse shaping and buffering, and applies the two data streams for transmission over a wiring facility 7. The wiring facility can be two pair of twisted wires, as is often found in offices or homes.

The two data streams travel down the twisted wire facility, and are received by line interface receivers 9. which recover and decode the data signals and derive the data clock signals. The resulting data and clock signal streams are applied to a pair division multiplex receiver 11, where the data and clock signals are recombined into a single output data and a single output clock stream.

The recombined data and clock stream from receiver 11 are applied to a near end framer receiver 13 which contains circuitry which determines proper frame alignment on the recombined stream. The near end framer receiver indicates its framing state with an out-of-frame (OOF) indication signal, which is passed to the pair division multiplex receiver to control its operation. When the OOF signal is at high logic level, the pair division multiplex receiver actively searches for proper framing alignment, even/odd pair selection, and deskews the two input data streams. When OOF is at low logic level, the pair division multiplex receiver is held in a fixed state.

From the standpoint of the signals from the input data to the output data streams, the system is completely transparent to the digital data stream.

Figure 2:
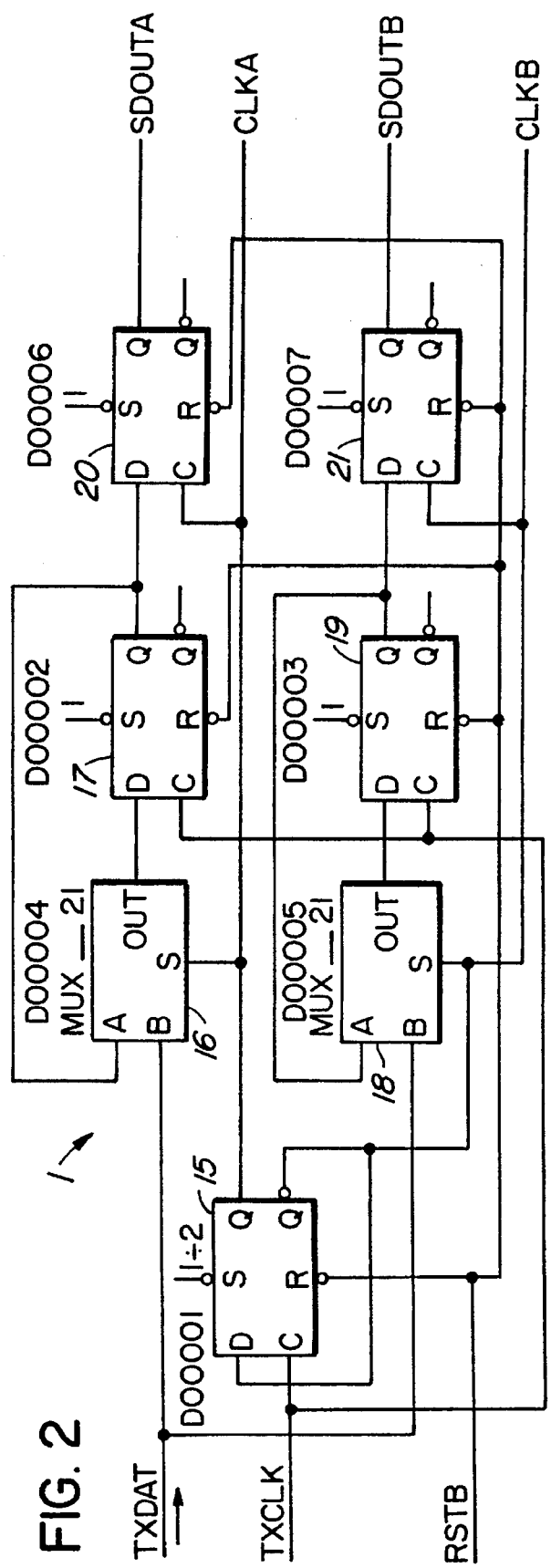

Turning to FIG. 2, a logic diagram of a framer transmitter 1 as may by used in the system of FIG. 1 is illustrated. The input transmit clock signal TXCLK is divided by two by a flip flop 15, the true and complement output phases being applied to the set inputs S of multiplexer-flip flop pairs 16, 17 and 18, 19, and providing two half rate clock signals CLKA and CLKB.

The input data signal is applied to the data inputs B of the multiplexers 16, 18. The output signals of the flip flops 17 and 19 are applied to the respective data inputs D of flip flops 20 and 21, in which they are retimed by the half-rate CLKA and CLKB signals. The result is a pair of digital data and clock streams, SDOUTA and CLKA, and SDOUTB and CLKB. One output stream is comprised of all of the even bits derived from the TXDAT input signal and the other output stream is comprised of all of the odd bits derived from the TXDAT input signal. It is not important which stream is even or odd, since the receiver circuit makes the correct determination.

The above described design, using multiplexers and flip-flops followed by retiming with the half-rate clocks minimizes the skew between the data and clock pairs SDOUTA/CLKA and SDOUTB/CLKB. Minimization of skew is important to provide the maximum timing margins for the line interface unit transmitters.

Figures 1, 3A:
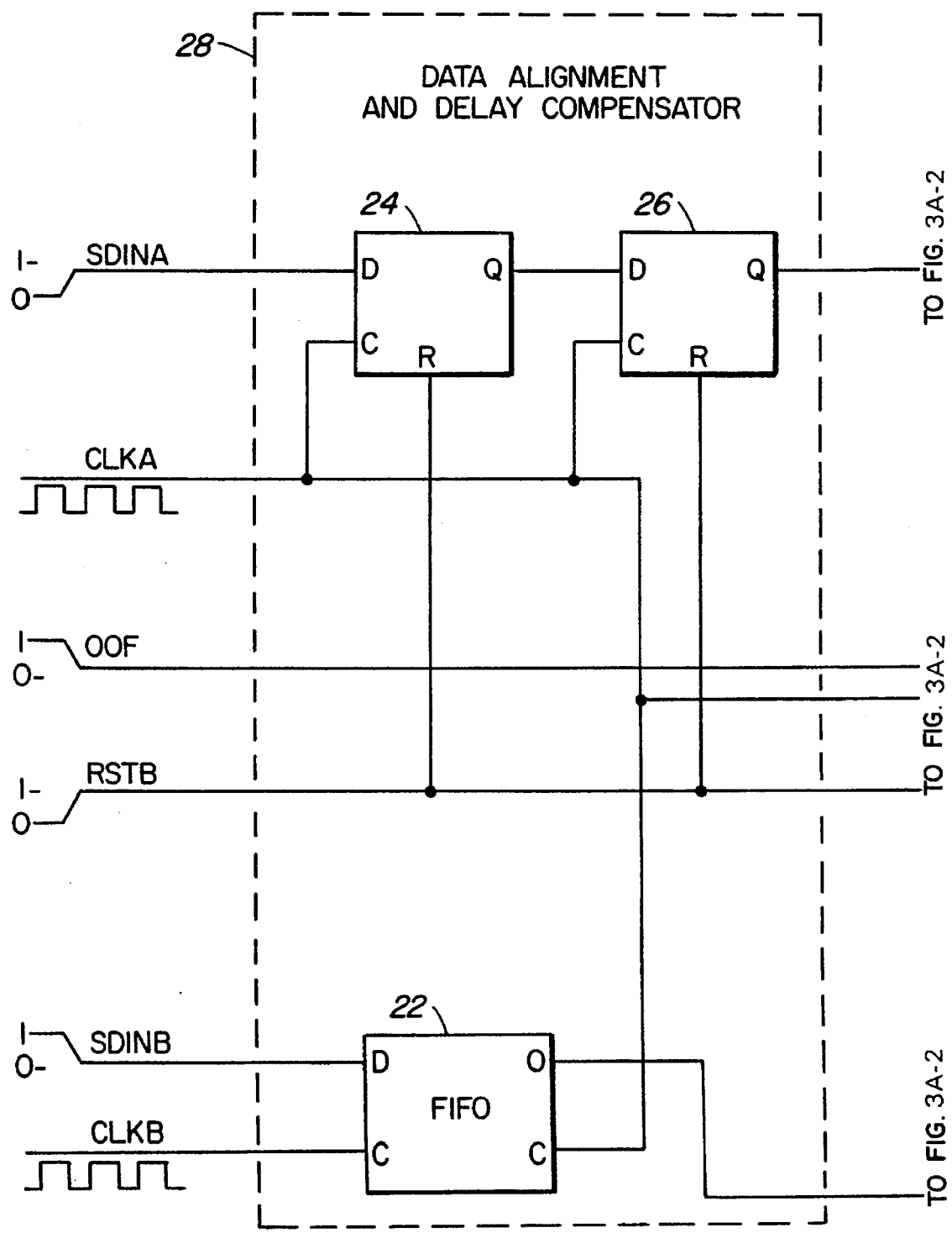
Figures 2, 3A:
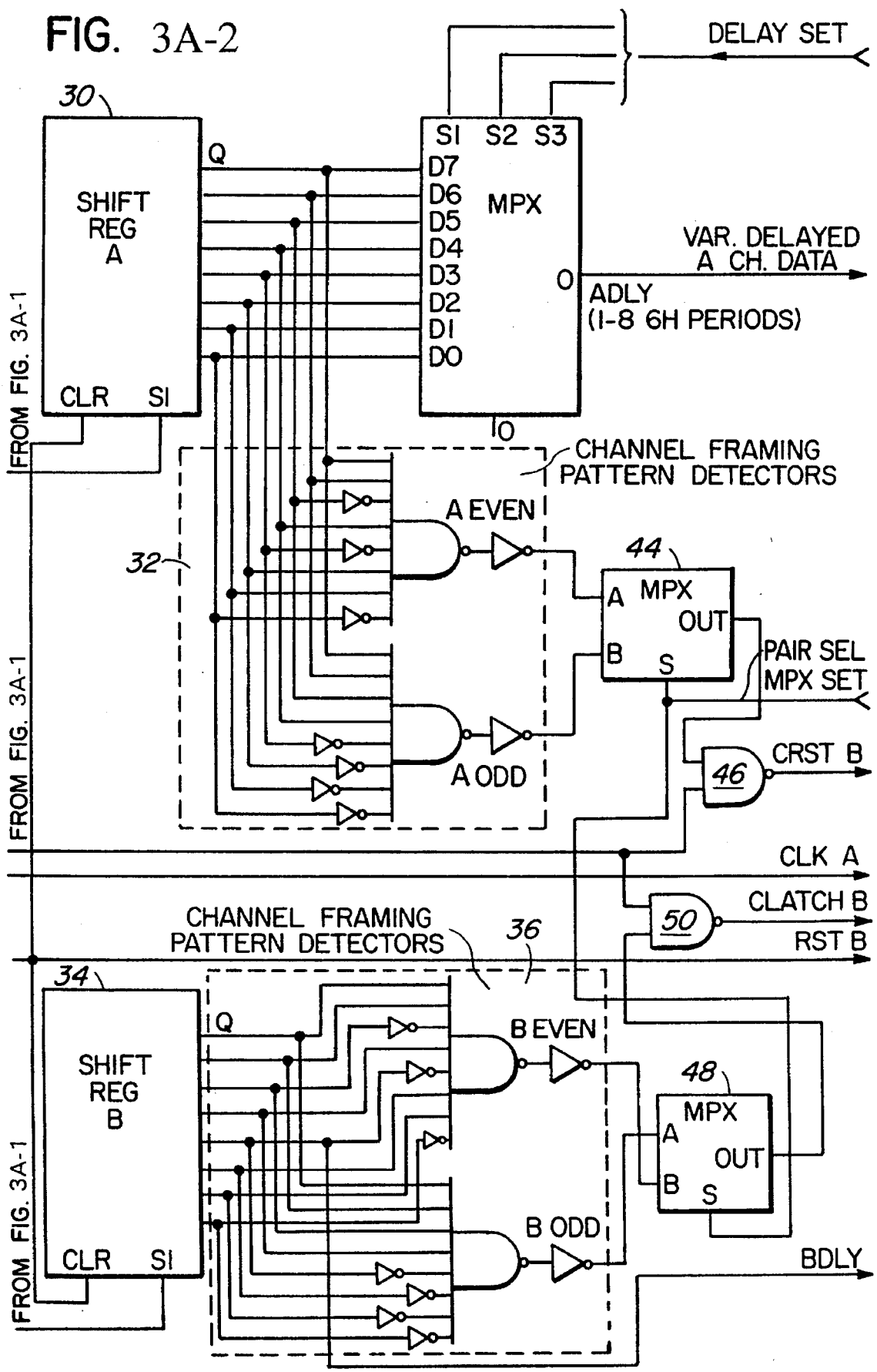
Figures 1, 3B:
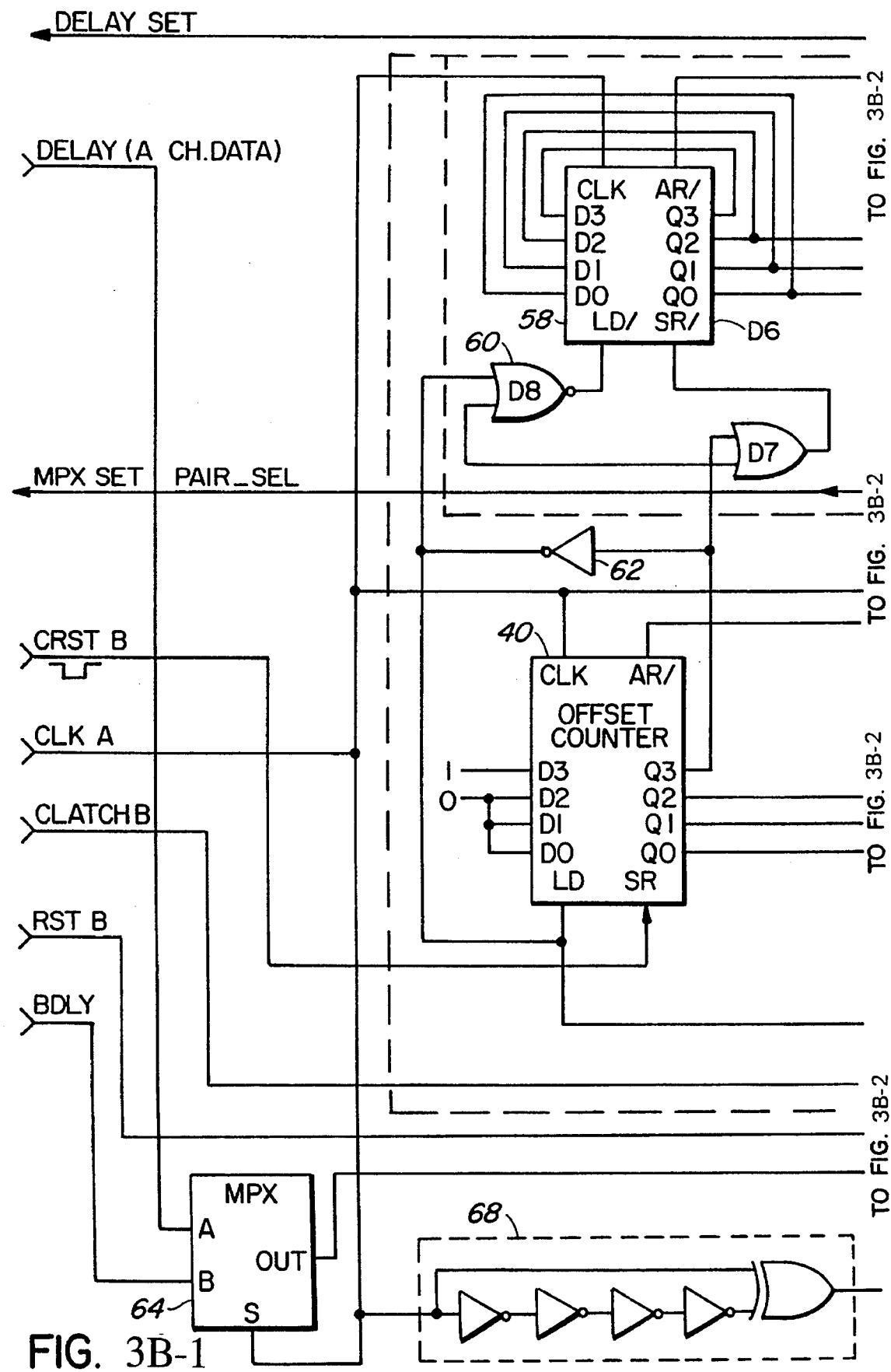
Figures 2, 3B:
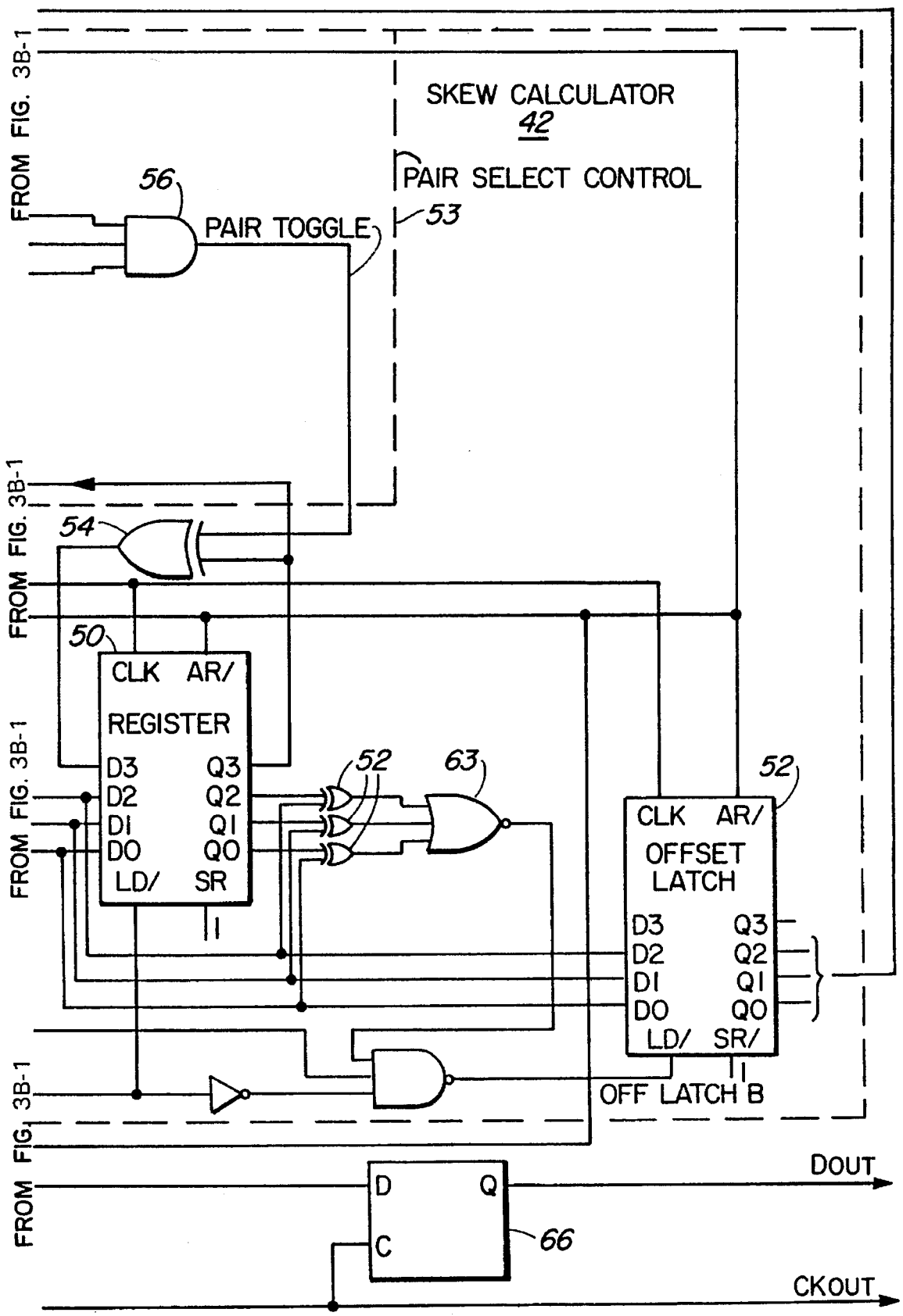

Turning now to FIGS. 3A and 3B, which are placed together side by side with FIG. 3A to the left of FIG. 3B, the pair division multiplex and near end framer receivers are shown in detailed logic form. The receivers take the even and odd data streams which contain even and odd framing bits, and determine the frame alignment of each stream. Even though at the transmitter these two streams have a fixed timing relationship, there is no guarantee of this when the streams reach the receiver. This difference is due to differences in the electrical length of the two wiring pairs with respect to each other. This can occur due to variations in manufacturing of the wiring cable, details of cable installation, or due to using pairs from non-related cables.

The two data stream signals are decoded in line interface unit receivers 9 (FIG. 1), wherein the two clock signals are also recovered. The two data streams, referred to herein as the A stream and the B stream, share a common clock frequency, but the two recovered clock signals CLKA and CLKB will be only arbitrarily aligned in phase. For this reason, a preferably 4 bit data alignment FIFO 22 is used to realign the B stream data to the CLKA clock signal.

The B stream data is received from a line interface unit receiver and is applied to the D input of FIFO 22, the CLKB clock signal being applied to its write clock input C. The A stream clock signal CLKA is applied to the read clock input C. The four bit FIFO has a two clock cycle delay. Logic within the FIFO ensures that the FIFO is normally centered for a two cycle delay.

In order to match the resulting B data stream delay, the A stream is also delayed by two clock cycles, by applying the A stream data SDINA to the D input of flip flop 24, which has its Q output connected to the D input of flip flop 26. Both flip flops 24 and 26 are clocked by the CKLA A stream clock signal. The delay compensation is inserted in order to allow the circuit to adjust equally for both positive and negative skews between the A and B data streams.

The two streams of input data have thus been aligned to the CLKA clock signal, a common timing base which will be used to operate most of the receiver circuitry, and the delay inserted in the B data stream has been compensated, in data alignment and delay compensator circuit 28.

A stream data output from the flip flop 26 is applied to the input of a shift register 30. The length of the shift register should depend on two factors; (a) the length of the framing pattern to be detected (eight bits, in the present example), and (b) the maximum expected skew between the two data streams. In this example, the skew can be eight bits. At the SONET STS-1 standard rate of 51 Mbit/s, this eight bits represent about 157 nanoseconds. If the maximum cable length is 100 meters, and signals travel at a speed of about $1.5 \times 10^8$ meters per second in the cable (one half the speed of light), this means that the maximum cable length variation can be about 23.5 meters, or about ±12%. At the SONET STS-3 standard rate of 155 Mbit/s, this cable length variation would be reduced to about ±4%. A 24 bit shift register can be used to allow ±12% at 155 Mbits/s.

For SONET protocols, the total number of framing bits used for STS-3 is 48 bits, the number for STS-1 is 16 bits. The increase in shift register length that is necessary to decode these framing bits is also the required increase to allow for a constant percentage skew accommodation. For SONET STS-3, however, it is not necessary to decode all 48 framing bits (24 in each framing pattern detector), since the same frame detect logic used for STS-1 will operate properly for STS-3 as well. Using the extra framing bits, however, will reduce the time to find frame alignment.

The A bit stream framing pattern detector 32 logic decodes both the odd and even framing bits for each pair. The resulting signals, shown as AEVEN and AODD in FIG. 3A, are decoded to the hexadecimal 'D6' and 'E0' for the SONET STS-1 and STS-3 respectively.

It is important that both odd and even pattern detections are performed for each pair of signals, so that pair select circuitry can automatically determine which one of the A or B data streams contains the even framing bits, and which one contains the odd framing bits. This simplifies wiring installation costs by making the proper connections of the wiring pairs to the equipment (between the transmitter and receivers) less important, and it simplifies the design of the transmitter, which can arbitrarily choose even and odd assignment without knowledge of frame boundaries.

A B data stream shift register 34, having equal length as the A data stream shift register 30, receives the B data stream data signal from the output of FIFO 22, and a B data stream framing pattern detector 36 logic decodes both the odd and even framing bits for each pair of signals of the B data stream. The resulting signals are shown as BEVEN and BODD, and as for the A data stream, are decoded to 'D6' and 'E0' respectively for the SONET STS-1 and STS-3 examples.

The outputs of shift register 30 are applied to a 1-of-eight multiplexer 38. This multiplexer provides for programming of input to output delay of the A data bit stream.

The multiplexer 38 should be the same length as the maximum skew length in bits, which will usually be the same length as the A and B bit stream shift registers 30 and 34. The delay is set by the inputs to S1, S2 and S3. The output signal from multiplexer 38 is shown as ADLY, and constitutes the delayed A data stream, and can change in a range from one to eight bit periods.

Since the B data stream BDLY from shift register 34 has been delayed by four bit periods in FIFO 22, the adjustment capability on the ADLY signal allows for a relative adjustment range of −3 to +4 bit periods of delay of the ADLY signal with respect to the BDLY signal, thus removing skew between the A and B data streams.

An offset counter 40 and associated circuitry in skew calculator 42 calculate and store the value of the relative time skew between the A and B data streams. Offset counter 40 calculates the skew between the A and B data streams.

Whenever external logic determines that the data stream is out of frame alignment, it applies a logic high level on the OOF lead. The AEVEN and AODD signals are applied to respective inputs of a multiplexer 44, the output of which is applied to one input of NAND gate 46. The OOF signal is applied to the other input of NAND gate 46. If the OOF lead is at high logic level, the output of the NAND gate 46 is the CRSTB signal Similarly, the BEVEN and BODD signals are applied to multiplexer 48 (to the opposite corresponding inputs as the AEVEN and AODD inputs to multiplexer 44). The output of multiplexer 48 is applied to one input of NAND gate 50, the other input receiving the OOF signal, the output of gate 50 being the CLATCHB signal.

It should be noted that an MPX SET signal is applied to the S inputs of both multiplexers 44 and 48, which, when high, causes reversal of the phases of the A and B data streams output from the multiplexers.

When the logic high level is on the OOF lead, due to the data stream being out of frame alignment, either an even or odd framing pattern detected by the A data stream frame pattern detector 32, as determined by the multiplexer 44, causes the CRSTB signal to pulse low for one clock cycle. Offset counter 40 is cleared, and begins counting.

A register 50 receives a count output from offset counter 40, and stores it. The Q0, Q1 and Q2 outputs of register 50 are applied to respective inputs of EXCLUSIVE OR gates 52, which have their outputs connected to corresponding inputs of NOR gate 63. The other inputs of EXCLUSIVE OR gates 52 are connected to corresponding outputs of counter 40.

The outputs of counter 40 which are connected to inputs of EXCLUSIVE OR gates 52 are connected to offset latch 52. The outputs of offset latch 52 are the delay set signal, applied to the delay set control inputs S1, S2 and S3 of multiplexer 38.

During normal operation, the B data stream frame pattern detector 36 indicates either an odd or even framing pulse pattern within eight clock cycles of the CRSTB pulse, and will drive the CLATCHB signal low for one clock cycle. When the CLATCHB pulses low the value from the offset counter 40 is compared with the previous value stored in register 50, which has received its value via its D0, D1 and D2 inputs from the Q0, Q1 and Q2 outputs of counter 40. If the two values are the same, indicated by the output of gate 63 going high, the OFF_LATCHB signal pulses low and the offset counter 40 value is stored in offset latch 52. If the two values are not the same, the value stored in offset latch 52 is not changed. In either case, the current offset counter 40 value is stored in the register 50 for future use.

By ensuring that two identical framing patterns occur in succession, the circuit is made immune to false framing patterns causing changes in the delay adjust selector. This is of importance for reliable operation and fast frame alignment.

Pair select (A or B odd and even data stream) circuitry 53 is comprised of EXCLUSIVE OR gate 54 having its output connected to the D3 input of register 50 and one input connected to the Q3 output of register 50. Its other input is connected to the output of AND gate 56, which has its inputs connected to the Q0, Q1 and Q2 outputs of pair select counter 58. Each of those outputs and output Q3 are connected to corresponding inputs D0, D1, D2 and D3. The Q3 output of counter 40 is connected to one input of NOR gate 60, which has its output connected to the SR data input of counter 58. The Q3 output of counter 40 is also connected to the input of inverter 62, the output of which is connected to the LD input of counter 40. The output of inverter 62 is also connected to the other input of NOR gate 60.

The above-described pair select circuitry, with part of register 50, automatically determines which of the A or B data streams contains the even and odd framing patterns. The circuitry operates with the assumption that if even and odd framing pattern detection sequences do not occur within eight clock cycles of each other, the selection of even/odd polarity may need to be reversed. To prevent erroneous assumptions about the even/odd polarity, several successive violations of the sequence must be detected before the state reversal occurs.

When the CLATCHB pulse does not occur within the allowed-for time (e.g. eight clock cycles) after the CRSTB pulse occurs, the offset counter 40 saturates at its maximum value, (which in the present example is the value of eight, but depends on the maximum skew adjustment range). When the CRSTB signal occurs, the pair select control counter 58 increments by one. After several successive sequences (seven in this example) with the offset counter 40 saturating, the pair select control decoder (AND gate 56) outputs a high level logic signal, causing the PAIR_SEL signal (applied to the control input of multiplexers 44 and 48) to change state on the next CLATCHB pulse. If a correct CRSTB-CLATCHB sequence occurs within the eight clock cycles allowed, the pair select control counter 58 will be cleared, forcing the count sequence to start over.

Therefore if there are eight successive CLATCHB pulses that do not occur within eight clock cycles after a CRSTB pulse, it is assumed that the sense of the even/odd pairs is reversed. The PAIR-SEL signal reverses state, causing the multiplexers 44 and 48 to invert the phases of the odd and even bitstreams, and the circuit again searches for correct framing pattern alignment.

This operation assumes that if A and B bit stream framing pulses are occurring, but that they are not within the skew time budget, then the odd and even transmission wiring pairs must be reversed. The pair select control circuitry 53 then reverses the even/odd sense in multiplexers 44 and 48, and tries again to align with the even/odd pattern detect logic pulses reversed. The circuitry will continue to reverse the even/odd sense and attempt to find a frame until a valid pattern is detected, as indicated by the OOF signal being driven to low logic level by the aforenoted external logic.

The above circuit provides an unique, simple and low cost circuit that facilitates the connection of twisted pair wiring. The installer does not have to be concerned about "odd" or "even" pairs connected at the input to the receivers, and the transmitter does not need to be synchronized to frame boundaries. The lowers the installation and support cost of systems that use the present invention.

As noted above, the pair select multiplexers 44 and 48 reverse the sense of the A and B data streams from even to odd and vice versa. However, instead of placing them as shown, they could instead have been connected in series with the data lines connected to the inputs of the channel shift registers 30 and 34, to switch the serial input data and clock lines between the A and B data streams. However, when connected as shown in the figure, the number of logic elements in the high speed clock lines is minimized.

The delayed A and B channel data streams ADLY and BDLY are applied to respective inputs to multiplexer 64, the CLKA clock signal being applied to its S (control) input. As a result the ADLY and BDLY data streams are interleaved at double the clock rate of the ADLY and BDLY signals.

The output of multiplexer 64 is applied to the D input of flip flop 66. Clock doubler 68 receives the CLKA clock signal and doubles its rate, applying the resulting double rate clock signal to the clock C input to flip flop 66. This retimes the combined data stream.

The result is an output data stream DOUT and a clock stream CKOUT which is identical to the input data stream and input clock stream at the input to transmitter 1.

An external framer device referred to earlier (not shown) analyzes the DOUT data stream, and determines if the combined data stream is correctly aligned by attempting to find a normal correct framing sequence and then verifying that this sequence repeats at the expected rate. If it does, it drives the OOF signal to low logic level, which freezes the operation of the delay synchronization circuit by locking gates 46 and 50. If the external framer device should fall out of frame for any reason, then the OOF signal is driven high, and the circuitry described above will begin realignment.

It is intended that the invention is not restricted to the two conductor A and B single bit lines, but that the transmitter should multiplex plural (such as eight) bit wide bit streams to two bit streams, transmit them to the receiver, and at the receiver demultiplex from two to the plural (such as eight) bit wide streams.

The transmission rates described are representative for the example given, but other transmission rates can be used, with longer channel shift registers and longer channel frame pattern detectors.

Other transmission protocols than the example ones given herein, with adjacent time framing patterns can be used, such as European E-3 or European E-4 formats.

The framing detect patterns can be register programmable. Further, multiple stages of the present invention can be cascaded, in order to allow the use of more pairs of wiring than the two described herein.

A person understanding this invention may now conceive of alternative structures and embodiments or variations of the above. All of those which fall within the scope of the claims appended hereto are considered to be part of the present invention.

I claim:

1. For use in a transmission system in which an input data stream is transmitted in plural data streams each at a fraction of the input data stream rate and plural clock stream pairs each at said fraction of an input data clock rate, a receiver, comprising:

a) means for receiving the plural data streams, b) means for determining frame timing differences between frame signals contained in each of the received plural data streams, c) means for varying and adjusting the relative timing of one received data stream relative to another based on the frame timing differences, d) means for combining the timing adjusted plural data streams into an output data stream having a similar data stream rate as the input data stream, e) means for recovering a clock from one of the plural data streams, and for generating an output clock signal therefrom at the input data clock rate, and f) means for aligning the output data stream with the output clock signal, whereby an output data stream and an output clock signal are provided having similar data rates as the input data stream and clock rates.

2. A receiver as defined in claim 1 in which the frame timing differences determining means includes means for determining timing differences of timing adjusted plural data streams and for locking the timing varying means to a fixed state upon determining no timing differences between the timing adjusted plural data streams.

3. A receiver as defined in claim 1 in which the number of plural data streams is two, including means for detecting which of a stream of data frames contains odd framing patterns and which of a stream of data patterns contains even framing patterns, means for reversing the even or odd sense of the framing patterns in the event the skew of the framing patterns relative to the data of one data stream is greater than a predetermined number of bits.

4. For use in a transmission system in which an input data stream is transmitted in a pair of data streams each at a fraction of the input data stream rate and a pair of clock stream pairs each at said fraction of the input data clock rate, a receiver, comprising:

a) means for receiving the pair of data streams, b) means for determining frame timing differences between frame signals contained in each of the received pair of data streams, c) means for varying the timing of one received data stream relates to another, whereby their relative timing is adjusted, d) means for detecting which of a stream of data frames contains odd framing patterns and which of a stream of data patterns contains even framing patterns, e) means for reversing the even or odd sense of the framing patterns in the event the skew of the framing patterns relative to the data of one data stream is greater than a predetermined number of bits, f) means for varying the timing of one data stream relative to the other with odd and even frames of data in correct order as determined by the odd and even frame detecting and sense reversing means, and g) means for combining the timing adjusted plural data streams into an output data stream having a similar data stream rate as the input data stream, whereby an output data stream having a similar data sequence and rate as the input data stream is provided.

5. A receiver as defined in claim 4, including means for recovering a clock from one of the plural data streams, and for generating an output clock signal therefrom at the input data clock rate, and means for aligning the output data stream with the output clock signal.

6. A transmission system comprising means for receiving an input data stream with repeating, adjacent multi-bit framing patterns and a synchronous clock at a first data rate and a first clock rate, means for dividing the input data stream into a pair of data streams and clock streams each at half the bit rate of the input data stream and input clock rate, each of the pair of data streams being comprised of even or odd bits from the input data stream and a half-rate clock signal, means for carrying the pairs of data and clock streams on separate transmission facilities, a receiver for receiving the pairs of data and clock streams via undifferentiated inputs, means in the receiver for automatically determining the odd and even nature of the bit data streams and means for interleaving the odd and even bit streams in proper order and with timing relative to the framing patterns to provide an output signal at the same data rate as the input data stream.

7. A transmission system as defined in claim 6, further including:

a) means for determining frame timing differences between frame signals contained in each of the received pair of data streams, b) means for varying the timing of one received data stream relates to another, whereby their relative timing is adjusted, c) means for detecting which of a stream of data frames contains odd framing patterns and which of a stream of data patterns contains even framing patterns, d) means for reversing the even or odd sense of the framing patterns in the event the skew of the framing patterns relative to the data of one data stream is greater than a predetermined number of bits, e) means for varying the timing of one data stream relative to the other with odd and even frames of data in correct order as determined by the odd and even frame detecting and sense reversing means, and f) means for combining the timing adjusted plural data streams into an output data stream having similar data stream rate as the input data stream, whereby an output data stream having a similar data sequence as the input data stream is provided.

8. A transmission system as defined in claim 7, further comprising means for recovering a clock from one of the plural data streams, and for generating an output clock signal therefrom at the input data clock rate, and means for aligning the output data stream with the output clock signal.

9. A transmission system as defined in claim 6, further comprising:

a) means for determining frame timing differences between frame signals contained in each of the received plural data streams, b) means for varying the timing of one received data stream relates to another, whereby their relative timing is adjusted, c) means for combining the timing adjusted plural data streams into an output data stream having similar data stream rate as the input data stream, d) means for recovering a clock from one of the plural data streams, and for generating an output clock signal therefrom at the input data clock rate, and e) means for aligning the output data stream with the output clock signal, whereby an output data stream and an output clock signal are provided having similar data rates as the input data stream and clock rates.

10. A transmission system as defined in claim 9 in which the frame timing differences determining means includes means for determining timing differences of timing adjusted plural data streams and for locking the timing varying means to a fixed state upon determining no timing differences between the timing adjusted plural data streams.

11. A transmission system as defined in claim 10 in which the number of plural data streams is two, including means for detecting which of a stream of data frames contains odd framing patterns and which of a stream of data patterns contains even framing patterns, means for reversing the even or odd sense of the framing patterns in the event the skew of the framing patterns relative to the data of one data stream is greater than a predetermined number of bits.

12. For use in a transmission system wherein an input data stream with repeating adjacent multi-bit framing patterns and a synchronous clock at a first data rate and a first clock rate is transmitted as pairs of data streams and clock streams each at half the bit rate of the input data stream and input clock rate, each of the pair of data streams being comprised of either even or odd bits from the input data stream and each of the clock streams being comprised of a half rate clock signal, a receiver comprising:

a) means for receiving decoded clock and data signals corresponding to first and second pairs of data and clock streams, b) means for aligning the decoded data signals of the second data stream to the clock of the first data stream, c) means for providing a controllable delay to the decoded data signals of the first data stream, d) means for detecting both even and odd framing patterns of the decoded first and second data streams, e) means for calculating and storing a value of a relative time skew between the delayed first data stream and the second data stream in the event a framing pattern is out of alignment with a data stream, f) means for applying a control signal to the controllable delay means for varying the first data stream by a controlled number of bits so as to interleave the first and second data streams evenly with respect to a framing pattern, and g) means for combining the interleaved first and second data streams to provide an output data signal.

13. A receiver as defined in claim 12, further including a pair of multiplexers each for receiving even and odd frame pattern indication signals from corresponding data streams and for outputting them in timed order which depends on the logic value of a sequence control signal, and means for changing the logic value of the sequence control signal in the event said skew is in excess of a predetermined number of clock cycles of each other, whereby the order of the even and odd data stream frame pattern indication signals is reversed, and the locations of the even and odd data stream framing bits is controlled to be associated with the correct one of the data streams prior to interleaving thereof.

14. A receiver as defined in claim 13 in which the means for detecting said framing patterns is comprised of a pair of shift registers, each for receiving a corresponding aligned decoded data signal stream, and each having depth at least as long as the length of a framing pattern to be detected plus expected skew between the first and second data streams, and a pair of decoders each connected to parallel outputs of a corresponding shift register.

* * * * *